(12) United States Patent
Zhang et al.

(10) Patent No.: US 11,546,887 B2
(45) Date of Patent: Jan. 3, 2023

(54) INFORMATION TRANSMISSION METHOD AND APPARATUS, AND COMPUTER STORAGE MEDIUM

(71) Applicant: ZTE CORPORATION, Guangdong (CN)

(72) Inventors: Dongying Zhang, Guangdong (CN); Yumin Wu, Guangdong (CN)

(*) Notice: Subject to any disclaimer, the term of this patent is extended or adjusted under 35 U.S.C. 154(b) by 178 days.

(21) Appl. No.: 16/477,909

(22) PCT Filed: Dec. 18, 2017

(86) PCT No.: PCT/CN2017/116864
§ 371 (c)(1),
(2) Date: Feb. 12, 2020

(87) PCT Pub. No.: WO2018/130049
PCT Pub. Date: Jul. 19, 2018

(65) Prior Publication Data
US 2020/0389882 A1 Dec. 10, 2020

(30) Foreign Application Priority Data
Jan. 13, 2017 (CN) .......................... 201710026342.4

(51) Int. Cl.
*H04W 72/04* (2009.01)
*H04W 76/30* (2018.01)
(Continued)

(52) U.S. Cl.
CPC ....... *H04W 72/0406* (2013.01); *H04W 28/08* (2013.01); *H04W 76/30* (2018.02);
(Continued)

(58) Field of Classification Search
CPC . H04W 72/0406; H04W 76/30; H04W 28/08; H04W 88/08; H04W 92/10;
(Continued)

(56) References Cited

U.S. PATENT DOCUMENTS

2012/0236782 A1* 9/2012 Bucknell ........... H04W 72/1221
370/315
2017/0034771 A1* 2/2017 Zhu ..................... H04W 36/08
(Continued)

FOREIGN PATENT DOCUMENTS

| CN | 101005495 | 7/2007 |
|---|---|---|
| CN | 106034345 | 10/2016 |
| CN | 107295637 | 10/2017 |

OTHER PUBLICATIONS

Huawei et al., "General Consideration on Light Connection,"R3-160655: 3GPP TSH-RAN WG3 Meeting #91bis, Apr. 14, 2016, section 2.
(Continued)

*Primary Examiner* — Kibrom T Hailu
*Assistant Examiner* — Nizam U Ahmed
(74) *Attorney, Agent, or Firm* — McDonald Hopkins LLC

(57) ABSTRACT

Provided is an information transmission method and apparatus. The method applied to a first base station includes: acquiring related information of a terminal, where the related information is uplink information or downlink information, and includes traffic data and/or control information; sending the related information to the second base station through a common transmission channel between base stations. When the related information is uplink information, the first base station is a current serving base station of the terminal, the second base station is a previous serving base station of the terminal, and the uplink information is supplied to the second base station to be decoded. When the related information is downlink information, the second base station is the current serving base station, the first base station is the previous serving base station, and the downlink information is sent to the terminal to be decoded. Further provided is a computer storage medium.

15 Claims, 4 Drawing Sheets

(51) Int. Cl.
  *H04W 28/08* (2009.01)
  *H04W 88/08* (2009.01)
  *H04W 92/10* (2009.01)
  *H04W 92/20* (2009.01)
(52) U.S. Cl.
  CPC .......... *H04W 88/08* (2013.01); *H04W 92/10* (2013.01); *H04W 92/20* (2013.01)
(58) Field of Classification Search
  CPC ..... H04W 92/20; H04W 76/34; H04W 72/12; H04W 72/121; H04W 72/1268; H04W 72/1273
  See application file for complete search history.

(56) References Cited

U.S. PATENT DOCUMENTS

| | | | | |
|---|---|---|---|---|
| 2017/0366328 A1* | 12/2017 | Seo | ............... | H04L 5/0051 |
| 2018/0248640 A1* | 8/2018 | Wei | ............... | H04W 48/16 |
| 2019/0124620 A1* | 4/2019 | Liang | ............... | H04W 76/27 |

OTHER PUBLICATIONS

Huawei et al.,"Way Forward on Light Connection," R3-161959: 3GPP TSG-RAN WG3 Meeting #93, Aug. 26, 2016, section 2.
Huawei et al.,"Procedures for Moving within RAN based Paging Area," R3-162156: 3GPP TSG-RAN WG3 Meeting #93, Oct. 14, 2016, section 2.
Patent Cooperation Treaty (PCT), International Search Report and Written Opinion for Application PCT/CN2017/0116864 filed Dec. 18, 2017, dated Feb. 26, 2018, International Searching Authority, CN.
Huawei et al.,"DL signalling triggered RAN based paging," R3-162159: 3GPP TSG-RAN3 Meeting #93, Oct. 2016.
Huawei et al.,"Consideration of Light connection open issues," R3-162756; 3GPP TSG-RAN3 Meeting #94, Nov. 2016.
State Intellectual Property Office of People's Republic of China, Notification of First Office Action for Application No. 201710026342.4 report dated Apr. 25, 2022 China.
State Intellectual Property Office of People's Republic of China, Notification of Search Report for Application No. 201710026342.4 report dated Apr. 19, 2022 China.

* cited by examiner

INFORMATION TRANSMISSION METHOD AND APPARATUS, AND COMPUTER STORAGE MEDIUM

CROSS-REFERENCE TO RELATED APPLICATION

This application is a 35 U.S.C. 371 national stage filing of PCT Application No. PCT/CN2017/0116864 filed on Dec. 18, 2017, which claims priority to Chinese patent application No. 201710026342.4 filed on Jan. 13, 2017, the disclosure of which are incorporated herein by reference in their entirety.

TECHNICAL FIELD

The present disclosure relates to the field of radio communications and, in particular, to an information transmission method and apparatus, and a computer storage medium.

BACKGROUND

A Long Term Evolution (LTE) network includes an Evolved Universal Terrestrial Radio Access Network (E-UTRAN) and a Core Network (CN). The E-UTRAN includes an evolved Node B (eNB). The CN includes a Mobile Management Entity (MME) and a Serving Gateway (S-GW) and the like. The eNB is connected to the CN via an S1 interface and the eNBs are connected to each other via an X2 interface. One eNB may manage one or more Cells. A User Equipment (UE) is also called as a terminal, an interface between the UE and a cell is called as a Uu port (air interface), and an LTE network architecture can be shown in FIG. 1.

In the existing LTE system, as stipulated in the current protocol, the terminal needs to access a base station to communicate with the base station, that is, the UE initiates a random access process.

To reduce the load of communication equipment or improve the effective utilization of spectrum resources, certain states of some terminals, such as a light connection state or an inactive state, are currently proposed. In such specific state, the connection through the Uu interface between the terminal and the base station is disconnected, but the connection through the S1 interface between the upper layer device and the base station on the network side of the terminal is maintained.

However, how to send uplink information and how to receive downlink information by the UE under such specific state is a problem to be solved in the prior art.

SUMMARY

In view of the above, embodiments of the present disclosure desire to provide an information transmission method and apparatus, and a computer storage medium, so as to solve the problem of information transmission of a UE in a specific state.

To solve the above problem, technical solutions of the present disclosure are implemented as follows.

A first aspect of an embodiment of the present disclosure provides an information transmission method applied to a first base station. The method includes: obtaining related information of a terminal, where the related information is uplink information or downlink information, and the related information includes traffic data and/or control information; sending the related information to a second base station through a common transmission channel between base stations. When the related information is the uplink information, the first base station is a current serving base station of the terminal, the second base station is a previous serving base station of the terminal, and the uplink information is supplied to the second base station to be decoded. Alternatively, when the related information is the downlink information, the second base station is a current serving base station of the terminal, the first base station is a previous serving base station of the terminal, and the downlink information is sent to the terminal to be decoded.

A second aspect of an embodiment of the present disclosure provides an information transmission method applied to the second base station. The method includes: receiving related information of a terminal sent by a first base station through a common transmission channel, where the related information is uplink information or downlink information, and the related information includes traffic data and/or control information; decoding the uplink information when the first base station is a current serving base station of the terminal and the second base station is a previous serving base station of the terminal; and sending the downlink information to the terminal when the first base station is a previous serving base station of the terminal and the second base station is a current serving base station of the terminal, where the related information is supplied to the terminal to be decoded.

A third aspect of an embodiment of the present disclosure provides an information transmission apparatus applied to the first base station. The information transmission apparatus includes: a first acquisition unit configured to acquire related information of a terminal, where the related information is uplink information or downlink information, and the related information includes traffic data and/or control information; a first communication unit configured to send the related information to a second base station through a common transmission channel between base stations. When the related information is the uplink information, the first base station is a current serving base station of the terminal, the second base station is a previous serving base station of the terminal, the uplink information is supplied to the second base station to be decoded. Alternatively, when the information is the downlink information, the second base station is a current serving base station of the terminal, and the first base station is a previous serving base station of the terminal, the downlink information is sent to the terminal to be decoded.

A fourth aspect of an embodiment of the present disclosure provides an information transmission apparatus applied to the second base station. The information transmission apparatus includes: a second communication unit configured to receive related information of the terminal sent by the first base station through the common transmission channel, where the related information is uplink information or downlink information, and the related information includes traffic data and/or control information; a decoding unit configured to decode the uplink information when the first base station is the current serving base station of the terminal and the second base station is the previous serving base station of the terminal; and a third communication unit configured to send the downlink information to the terminal when the first base station is the previous serving base station of the terminal and the second base station is the current serving base station of the terminal, and the related information is sent to the terminal to be decoded.

An embodiment of the present disclosure provides a computer storage medium. The computer storage medium is stored with computer-executable instructions. After being executed, the computer-executable instructions are used for implementing the information transmission method provided by one or more of solutions described above.

According to the information transmission method and apparatus provided by the embodiment of the present disclosure, upon receiving the uplink information or the downlink information of the terminal, the first base station sends the uplink information/downlink information to the second base station through the common transmission channel between the base stations to be decoded or sends the uplink information/downlink information to the second base station through the common transmission channel, and then the uplink information/downlink information is forwarded to the terminal by the second base station to be decoded by the terminal. In this way, even if the terminal is in the specific state, the base stations can transmit information to a communication device for decoding the related information via information interaction of the common transmission channel, so that the information transmission of the UE in the specific state is realized, and rapid decoding for the related information can be realized.

DETAILED DESCRIPTION

Technical solutions of the present disclosure will be further described in detail with reference to the drawings and specific embodiments.

Figure 1:
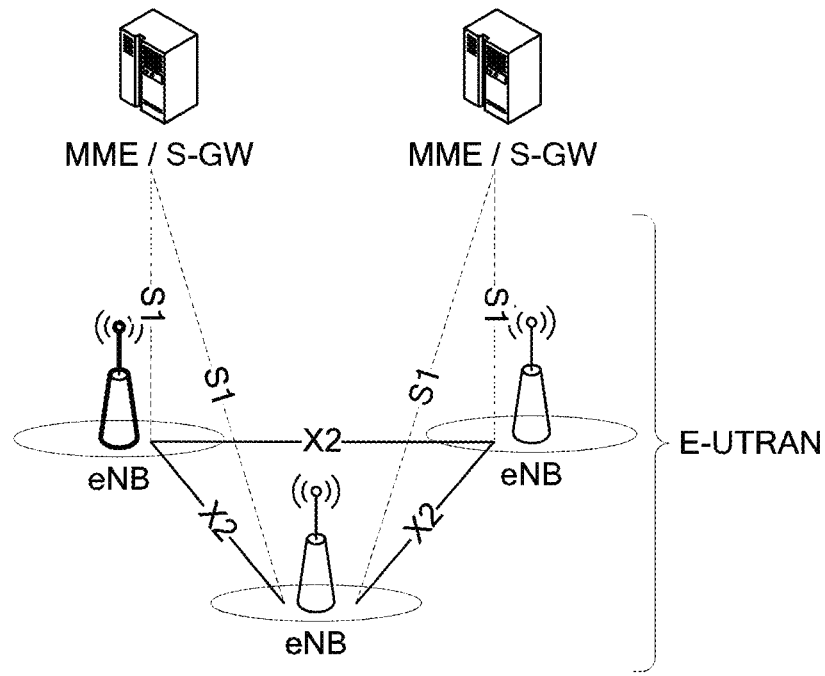
FIG. 1 is a structural diagram of a communication system according to an embodiment of the present disclosure.
Figure 2:
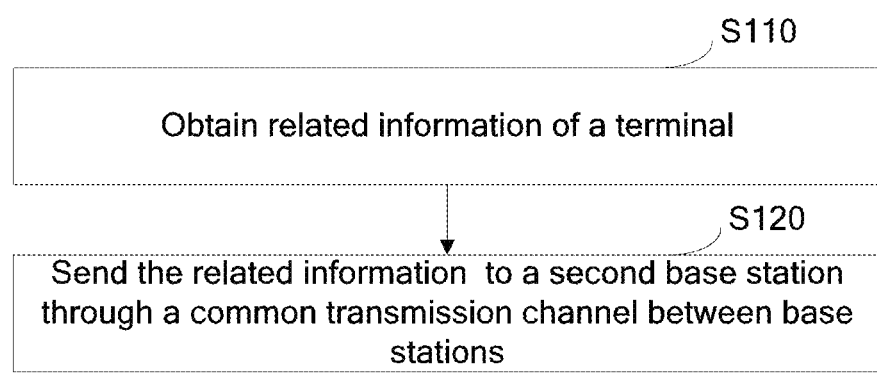
FIG. 2 is a flowchart of a first information transmission method according to an embodiment of the present disclosure.

As shown in FIG. 2, the present embodiment provides an information transmission method applied to a first base station. The information transmission method includes the following steps.

In step S110, related information of a terminal is obtained. The related information is uplink information or downlink information, and includes traffic data and/or control information.

In step S120, the related information is sent to a second base station through a common transmission channel between base stations.

When the related information is the uplink information, the first base station is a current serving base station of the terminal, the second base station is a previous serving base station of the terminal, and the uplink information is supplied to the second base station to be decoded.

Alternatively, when the related information is downlink information, the second base station is a current serving base station of the terminal, the first base station is a previous serving base station of the terminal, and the downlink information is sent to the terminal to be decoded.

The information transmission method in the present embodiment is applied to a base station. In the present embodiment, the first base station and the second base station may be various types of base stations, such as an eNB or a next generation base station (gNB) or a small cell base station or a home base station or a small base station.

The terminal is a mobile terminal capable of connecting to the base station.

In the present embodiment, the UE may be a UE in a specific state, and the specific state may be a light connection state or an inactive state. In the specific state, a Uu interface between the UE and the base station is disconnected, but a connection of the S1 interface on a network side of the UE is maintained. At this moment, an MME or other communication equipment may still send information to the UE via network. However, after the information is transmitted to the base station to which the UE was connected previously, the connection to the UE needs to be reestablished so that the information is sent to the UE or the UE sends information.

In the present embodiment, the UE may send uplink data through a common transmission resource, so that the UE may send data without accessing through a random access resource, thereby improving the data transmission rate. In the present embodiment, the common transmission resource may include a common unauthorized transmission resource including spectrum resources and time domain resources.

In the present embodiment, a common transmission channel is established between the base stations, and the common transmission channel may be used for mutual data transmission between the base stations. In the present embodiment, a common transmission channel is established between any two base stations in the same paging area or tracking area, and the common transmission channel may be a transmission tunnel established by using a General Packet Radio Service Tunneling Protocol (GTP).

In the present embodiment, the terminal in the preset state, due to a mobility characteristic thereof, may move from a coverage of one base station to a coverage of another base station. In the present embodiment, if the first base station is the current serving base station of the terminal, the second base station is the previous serving base station of the terminal.

Alternatively, if the first base station is the previous serving base station, the second base station is the current serving base station of the terminal.

For example, when the terminal in the inactive state moves to a coverage of the first base station, uplink information needs to be sent, and the uplink information is sent to the first base station through the common transmission resource. Since the terminal moves from a coverage of the second base station to the coverage of the first base station, the first base station has not stored the context of the uplink information sent by the terminal. Therefore, it is difficult for the first base station to correctly decode the currently received uplink information without the context of the uplink information. In the present embodiment, the first base station sends the uplink information to the second base station through the common transmission channel between the first base station and the second base station. Since the second base station is the previous serving base station of the terminal and stores the context previously sent by the terminal through uplink transmission, after receiving the uplink information, the second base station can correctly decode the current uplink information based on the context stored. In this way, the forwarding of the uplink information between the two base stations is conveniently realized through the common transmission channel, and the second base station parses the uplink information sent from the terminal without forwarding the previous context to the first base station, so that the information interaction quantity and the interaction times between the first base station and the second base station are reduced.

If the first base station is the previous serving base station and the second base station is the current serving base station, the first base station receives downlink information sent to the terminal by an upper network element. The upper network element herein may include the MME or a gateway and the like, such as core network devices etc.

The first base station sends the downlink information received from other devices to the current serving base station of the terminal, namely the second base station, through the common transmission channel. Thus, the second base station receives the downlink information and then sends the downlink information to the terminal. The downlink information is sent through the common transmission channel.

In the embodiment of the present disclosure, the uplink information is information sent to the base station from the terminal, and is sent via an uplink. The downlink information is information sent to the terminal from a network element on the network side, such as the base station, and is sent via a downlink.

In the present embodiment, a convenient transmission of the uplink information and/or the downlink information of the terminal in the specific state is achieved through the common transmission channel, so that the problem that the terminal in the specific state cannot successfully send the uplink information and/or the downlink information is solved.

Optionally, step S110 includes receiving uplink information sent by a terminal in a preset state through the common transmission resource, where the terminal in the preset state includes: a terminal disconnected with the second base station at the Uu interface and connected with the second base station at the S1 interface.

The uplink data herein may include various information that the terminal desires to send. The uplink data is sent by the terminal in the preset state through the common transmission resource. The common transmission resource herein does not need to be scheduled by one base station to another base station, and is used for sending the uplink information after being forcibly occupied by the terminal and other communication equipment.

In other embodiments, step S110 may include receiving the downlink information of the terminal.

Step S120 may include sending the downlink information to the second base station through the common transmission channel when the terminal is in the preset state, where the terminal in the preset state includes: a terminal disconnected with the first base station at the Uu interface and connected with the first base station at the S1 interface.

Since the terminal is in the preset state, the terminal needs to be paged first if it is desired to send the downlink information to the terminal. Therefore, in the present embodiment, the method further includes: sending a paging message for paging the terminal in the preset state after receiving the downlink information; receiving a response message sent by the second base station through the common transmission channel, where the response message includes a paging response generated by the terminal based on the paging message, or an indication information of the second base station indicating that the terminal has been paged.

Step S120 may include sending the downlink information to the second base station through the common transmission channel after receiving the response message.

When the first base station pages the terminal, the second base station receives the paging message and forwards the paging message in a coverage range of the second base station. The terminal located in the coverage range of the second base station will receive the paging message and send a paging response to the second base station. In the present embodiment, in order to inform the first base station that the terminal has been paged, the second base station may directly forward the paging response of the terminal to the first base station through the common transmission channel, or may generate, based on the paging response sent by the terminal, the indication information indicating that the terminal has been paged. In this way, after receiving the response message including the paging response or the indication information, the second base station knows that the terminal is currently paged, and the downlink information of the terminal may be sent, through the common transmission channel, to the first base station which has paged the terminal. In the present embodiment, in addition to the paging response or the indication information, the response message may be other information capable of indicating that the corresponding terminal has been paged.

In some embodiments, the method further includes: acquiring control information; and packaging the control information with uplink data or downlink data into a data packet in a preset format. The control information herein may be used for decoding the related information or authenticating the terminal, etc. The uplink data herein may be any data transmitted to the base station from the terminal; and the downlink data may be any data that needs to be sent to the terminal by the upper network element.

In the present embodiment, the uplink control information and the uplink data are packaged into a data packet in the preset format, and the downlink control information and the downlink data are packaged into a data packet in a preset format. The data packet typically includes a header and a text. The uplink data or the downlink data are the composition content of the text. The control information may be used as the composition content of the header. In the present embodiment, the control information may be used to authenticate the terminal, and may also be used to search for a context stored in the base station.

In step S120, the data packet is sent to the second base station through the common transmission channel.

In the present embodiment, the packaged packet is sent to the second base station. The first base station and the second base station both predefine or pre-negotiate the preset format, and the package of this type of format facilitates the decoding of the receiving end.

In some embodiments, the control information is acquired by acquiring a channel identifier and/or auxiliary information of the common transmission channel, where the channel identifier is used by the second base station for determining a source base station of the related information, and the auxiliary information is used for authenticating the terminal.

In the present embodiment, the identification information of the common transmission channel may include various identifiers such as a tunnel identity (ID). After receiving the related information, the second base station may determine the source base station according to the channel identity. The source base station herein is the first base station. The auxiliary information includes at least one of authentication information, a terminal identifier and a logical channel identifier. The authentication information may be used to authenticate the terminal. The authentication herein may be security verification or authority authentication, and the like. The authentication information may be a Short Media Access Control-Input. The Short Media Access Control-Input can be used for identifying and verifying the terminal in Radio Resource Connection (RRC) reconstruction and RRC establishment recovery request message in a Narrow Band Internet Of Things (NB-IoT), and a security algorithm of the base station is adopted.

The terminal identifier may include information such as a communication identifier of the apparatus or a physical identifier of the communication apparatus or a recovery identifier allocated to the terminal in the paging area. The recovery identifier may include an identifier of a base station connected to the UE and an identifier of the UE itself, which is not limited to the above identifier in the concrete implementation.

The logical channel identifier herein may include, in an order from high to low of the LTE user plane, a Packet Data Convergence Protocol (PDCP) layer, a Radio Link Control (RLC) layer, a Media Access Control (MAC) layer, and a Physical (PH) Y layer. The logical channel is a channel between the RLC layer and the MAC layer, and each logical channel has an identifier. A data packet of the MAC layer reuses data of multiple logical channels (how much data and priority of the logical channel is taken by each logical channel).

In some embodiments, step S120 may include: sending the auxiliary information to the second base station once through the common transmission channel.

In other embodiments, step S120 includes: sending the auxiliary information to the second base station through the common transmission channel in a semi-persistent way.

During multiple transmission process of related information of one UE, the auxiliary information is sent once every time the information transmission is performed, thereby causing the problem of multiple transmission times of the auxiliary information and the problem of information redundancy. However, the multiple transmission of the related information may require the same auxiliary information. In the present embodiment, the auxiliary information is transmitted only once during the multiple transmission process to reduce the transmission of the auxiliary information, thereby reducing signaling overheads between the base stations. The auxiliary information may also be sent in a semi-persistent way in some embodiments. The semi-persistent way herein may be understood as periodically sending the auxiliary information within a specified time range, or may be understood as one resource scheduling in which the auxiliary information is sent through the scheduling resource multiple times and time intervals between multiple transmissions may be considered to be equal to each other.

The common transmission channel is established between two base stations in the same paging area or between two base stations in the same tracking area. In the present embodiment, the common transmission channel may be a transmission channel established through the GTP.

Figure 3:
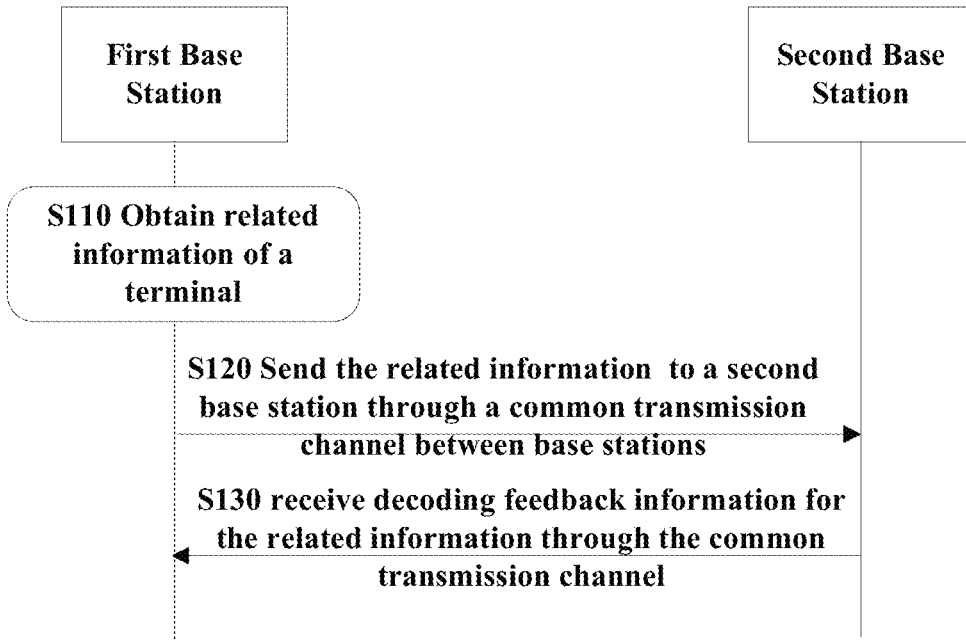
FIG. 3 is a flowchart of a second information transmission method according to an embodiment of the present disclosure.

As shown in FIG. 3, the method of the present embodiment may further include step S130.

In step S130, decoding feedback information for the related information is received through the common transmission channel.

The decoding feedback information in the present embodiment may be decoding feedback of the terminal for the related information, or decoding feedback of the second base station. The decoding feedback information in the present embodiment may be: decoding feedback information indicating decoding success or decoding feedback information indicating decoding failure.

Upon the receipt of the decoding feedback information, the first base station is aware of whether the related information sent through the common transmission channel is decoded successfully or not.

When the related information includes uplink information, the method further includes: forwarding the decoding feedback information to the corresponding terminal. In the present embodiment, the first base station may decode the decoding feedback information by itself or transmit the decoding feedback information to the terminal.

When the related information includes downlink information, the decoding feedback information is the decoding feedback of the terminal for the downlink information. The method may further include: the first base station may also forward the decoding feedback information to a corresponding upper network element or an initial source of the downlink information.

Figure 4:
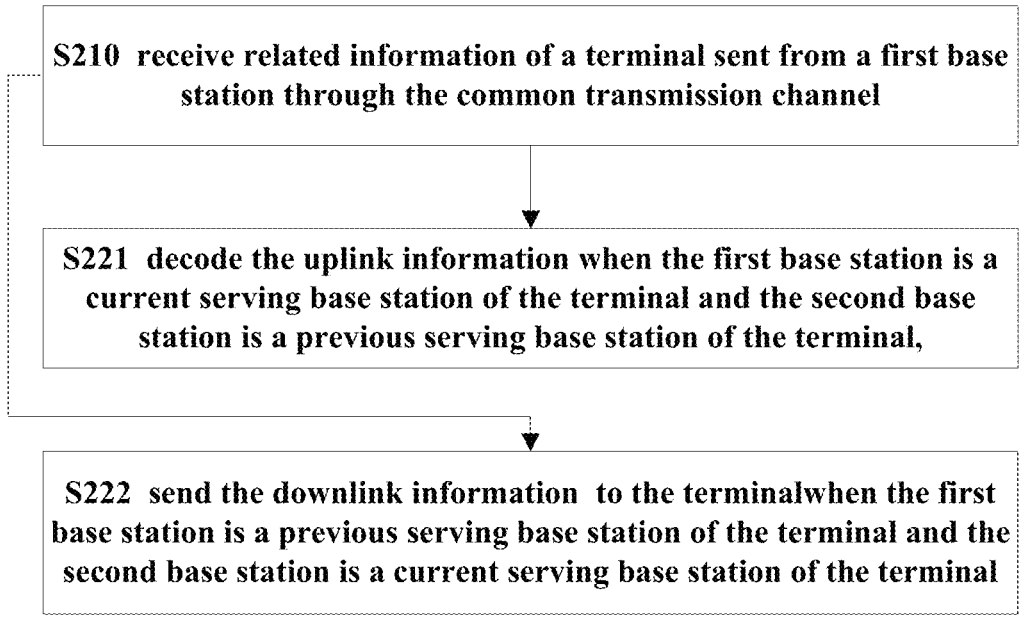
FIG. 4 is a flowchart of a third information transmission method according to an embodiment of the present disclosure.

As shown in FIG. 4, the present embodiment provides an information transmission method applied to the second base station. The information transmission method includes the following steps.

In step S210, related information of a terminal sent from a first base station through the common transmission channel is received, where the related information is uplink information or downlink information, and the related information includes traffic data and/or control information.

In step S221, when the first base station is a current serving base station of the terminal and the second base station is a previous serving base station of the terminal, the uplink information is decoded.

In step S222, when the first base station is a previous serving base station of the terminal and the second base station is a current serving base station of the terminal, the downlink information is sent to the terminal, and the downlink information is supplied to the terminal to be decoded.

According to the method applied to the second base station described in the present embodiment, the second base station receives related information of the terminal through the common transmission channel, where the related information herein may be one of uplink information or downlink information, and the related information may include traffic data and/or control information.

In some embodiments, when the second base station is the current serving base station of the terminal, the method further includes steps described below.

A paging message of the first base station for paging the terminal in the preset state is forwarded, where the terminal in the preset state includes a terminal disconnected with the first base station at the Uu interface and connected with the first base station at the S1 interface.

A paging response message returned by the terminal based on the paging message is received.

A response message returned based on the paging message is received through the common transmission channel, where the response message includes the paging response or indication information generated based on the paging response and indicating that the terminal has been paged.

Step S210 may include: receiving the downlink information sent through the common transmission channel after the terminal has been paged by the second base station.

If the base station receives the downlink information of the terminal in the preset state, the terminal is paged. At this moment, the second base station also receives the paging message and pages the terminal within the coverage range of the second base station. If the terminal receives the paging message and finds that the object to be paged is the terminal itself, the terminal sends a paging response. In this way, the second base station receives the paging response of the terminal. After receiving the paging response, the second base station may directly forward the paging response to the first base station, or may send, according to the paging response, an indication information indicating that the second base station has paged the terminal to the first base station. Therefore, the first base station knows that the current second base station has paged the terminal. In the present embodiment, the response message is also sent through the common transmission channel, so that the first base station knows which base station has paged the terminal through the common transmission channel on which the response message is transmitted, or directly knows the common transmission channel through which the downlink information is forwarded to the corresponding terminal. For example, when the first base station receives the response message through a common transmission channel A, the downlink information is sent to another base station through the common transmission channel A.

After forwarding the response message, the second base station receives downlink information forwarded by the first base station from the common transmission channel. Further, the downlink information needs to be issued to the terminal.

Further, step S210 may include receiving the uplink information of the terminal forwarded by the first base station through the common transmission channel.

In the present embodiment, when the second base station is a previous serving base station of the terminal, the second base station receives the uplink information transmitted by the terminal, and a context of the uplink information transmitted at the current time is stored in the first base station. Therefore, the uplink information is decoded conveniently.

In yet another embodiment, the method further includes: receiving a channel identifier and/or auxiliary information of the common transmission channel, where the channel identifier is used by the second base station for determining a source base station of the related information, and the auxiliary information includes at least one of authentication information, terminal identifier and logical channel identifier.

The authentication information may be utilized for authentication and/or various information in the present embodiment. The terminal identifier may be used to locate the context or to locate the terminal. The logical channel identifier may be used to indicate a logical channel corresponding to the terminal.

In yet another embodiment, the method further includes sending decoding feedback information of the related information to the first base station through the common transmission channel.

When the related information is uplink information, sending decoding feedback information of the related information to the first base station through the common transmission channel includes: according to the decoding result of the second base station for the uplink information, sending the decoding feedback information to the first base station through the common transmission channel.

When the related information is downlink information, sending decoding feedback information of the related information to the first base station through the common transmission channel includes: receiving the decoding feedback information of the downlink information transmitted from the terminal; and sending the decoding feedback information to the first base station through the common transmission channel.

Several specific examples are provided below in conjunction with any embodiment described above.

EXAMPLE 1

Figure 5:
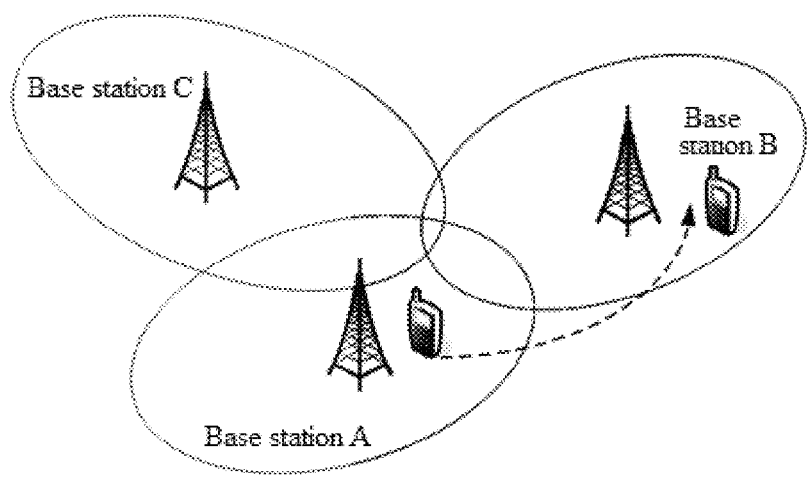
FIG. 5 is a schematic diagram in which a UE in a specific state moves according to an embodiment of the present disclosure.

Taking an LTE system as an example, as shown in FIG. 5, base station A is a source base station of a UE, and base station B and base station C as well as base station A are located in the same paging area. The UE is in an inactive state, the UE moves out of a service area of the source base station (base station A), and moves to a new serving base station B. When uplink data the of the UE arrives, the following operations are performed.

In step 1, base station A, base station B, and base station C all set a default common transmission channel for common data/control information. The default common transmission channel is used for transmitting data information between the base stations, and may use GTP currently used in the LTE system.

In step 2, the terminal sends data to the current serving base station, i.e. base station B. The terminal also needs to send related identification information of the UE to base station B. The related identification information herein may include various identification information such as a terminal identifier.

In step 3, base station B forwards, through the common transmission channel, the received uplink data and control information to the source base station, i.e., base station A. The related control information includes authentication information for UE authentication.

Figure 6:
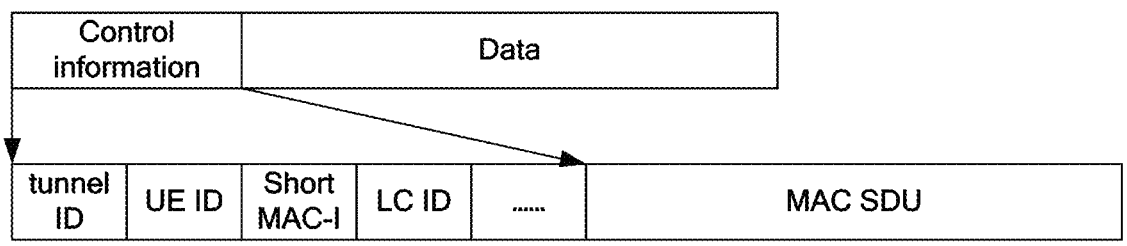
FIG. 6 is a schematic diagram illustrating a format of a data packet provided by an embodiment of the present disclosure.

Base station B may forward the related control information and the uplink data of the terminal to base station A in the following manner: base station B forwards the control information and uplink data received from the terminal to the source base station in an information format similar to that shown in FIG. 6.

The control information includes identification information of the common transmission channel (such as a tunnel ID). Further, the control information may include some auxiliary information. The auxiliary information may include: information for authenticating the UE (e.g., Short MAC-I), UE ID (e.g., Resume identification information ID), logical channel ID (LC ID), etc.; and the data sent by the terminal is a traffic data unit (MAC SDU).

In step 4, base station A receives the data/control information forwarded by base station B through the common transmission channel and parses the data/control information.

In optional step 5, after the data of the terminal is parsed, the source base station feeds back response information.

The response information fed back by the source base station may include the following information: information about whether the decoding is successful or not, whether the authentication of the UE is successful or not, context information of the UE, etc.

EXAMPLE 2

Taking an LTE system as an example, as shown in FIG. 5, base station A is a source base station (connected with the S1) of a UE, and base station B and base station C as well as base station A are located in the same paging area. The UE is in an inactive state, the UE moves out of a service area of the source base station (base station A) and moves to a new serving base station B. When uplink data of the UE arrives, the following operations are performed.

In step 1, base station A, base station B, and base station C all set a default common transmission channel. The default common transmission channel is used for transmitting data and/or control information between the base stations, and the common transmission channel may use a GTP protocol currently used in the LTE system.

In step 2, the terminal sends data to the new base station, i.e. base station B. Further, the terminal needs to send related identification information of the UE to the current base station.

In step 3, the current serving base station forwards the received data and control information to the source base station through the common transmission channel. The control information mainly includes authentication information of the UE, and the like. The current serving base station may forward the related control information and the data information of the terminal to the base station respectively by using the following method: the current serving base station sends the control information and the data of the terminal to the source base station in a preset format (as shown in FIG. 6). Through this step, the advantage is that the control information can be sent only once or sent in a semi-persistent manner, so that part of the control information, such as the related control information (Short MAC-Input) for authenticating the UE need not be sent along with the data packet every time, which reduces the waste of resources.

Figure 7:
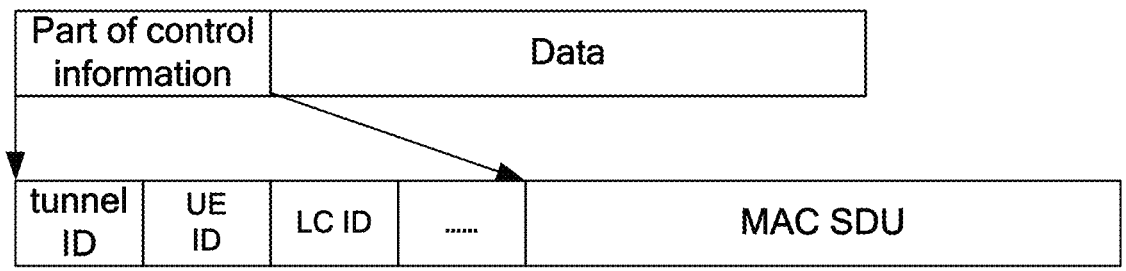
FIG. 7 is a schematic diagram illustrating another format of a data packet provided by an embodiment of the present disclosure.

FIG. 7 is a schematic diagram of the format of a data packet used by the current serving base station for forwarding the data and the control information to the source base station. Compared with the format of the data packet shown in FIG. 6, the header as shown in FIG. 7 does not include Short MAC-I for authentication, but the specific implementation may include this information.

For example, the control information includes information of a related common transmission channel (e.g., a tunnel ID), information for authenticating the UE (e.g., Short MAC-Input), identification information of the UE (Resume ID), and the like.

The control information needs to be carried in front of the data includes information of the related common transmission Channel (such as a tunnel ID), identification information of the UE (Resume ID, configured to uniquely identifying the terminal), a Logical Channel Identity (LC ID), and the like. The LC ID herein may be used to indicate the logical channel of the user plane carrying the data. The data sent by the terminal is MAC SDU.

In step 4, the source base station receives the data and the control information forwarded by the current serving base station through a common data/control information transmission channel and parses the data and the control information.

In optional step 5, after the data of the terminal is parsed, the source base station feeds back response information.

The response information fed back by the source base station may include the following information: information about whether the decoding is successful or not, whether the authentication of the UE is successful or not, context information of the UE, etc.

EXAMPLE 3

Taking an LTE system as an example, as shown in FIG. 5, base station A is a source base station of a UE, and base station B and base station C as well as base station A are located in the same paging area. The UE is in an inactive state, the UE moves out of a service area of base station A and moves to a service area of the serving base station B. When downlink data of the UE arrives at base station A, the following operations are performed.

In step 1, base station A, base station B, and base station C all set a default common transmission channel. The default common transmission channel is used for transmitting data and/or control information between the base stations, and the common transmission channel may use a GTP currently used in the LTE system.

In step 2, base station A initiates a paging (both of base station B and base station C receive a paging message) based on a side of a Radio Access Network (RAN).

In step 3, base station B and base station C receive the paging message of base station A and then forward the paging message.

In step 4, the terminal receives the paging message of base station B and reports a paging response (carrying identification information of the terminal, such as a resume ID) in response to the paging message.

In step 5, base station B sends the received paging response to base station A through the common transmission channel or base station B indicates base station A that the terminal being paged by base station A receives the paging message of base station A. The response message needs to include the identification information of the terminal.

In step 6, base station A sends data information and/or control information to base station B through the common transmission channel, where the control information mainly includes authentication information of the UE and the like. Base station A may send the related control information and data information of the terminal to base station B respectively in the following manner: base station A sends the control information and the data of the terminal to base station B in separate formats, as shown in FIG. 6. In this way, the advantage is that the control information can be sent only once or sent in a semi-persistent way, so that part of the control information, such as the related control information for authenticating the UE (Short MAC-I) needs not be sent with the data packet every time, which reduces the waste of resources.

The control information includes identification information of a related common transmission channel (e.g., a tunnel ID), information for authenticating the UE (e.g., Short MAC-Input), identification information of the UE (Resume ID), and the like. The control information that needs to be carried in front of the traffic data includes information of the common transmission Channel (such as a tunnel ID), identification information of the UE (Resume ID, configured to uniquely identifying the terminal), a Logical Channel ID (identifying bearer information of the data of UE), and the like. The data sent by the terminal is MAC SDU.

In step 7, base station B sends the data and/or control information received from base station A to the terminal.

In step 8, the terminal parses the received data and/or control information and feeds back decoding feedback information. The decoding feedback information fed back by the terminal may be used to indicate whether the decoding is successful or not, and the like.

Figure 8:
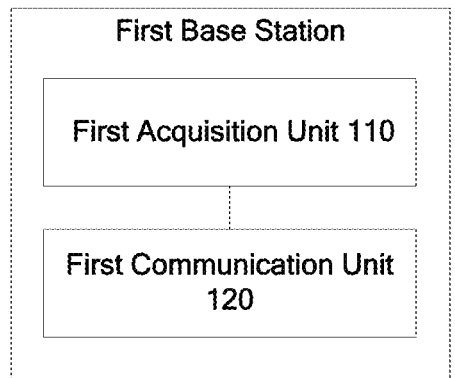
FIG. 8 is a structural diagram illustrating a first base station according to an embodiment of the present disclosure.

As shown in FIG. 8, the present embodiment provides an information transmission apparatus applied to the first base station. The information transmission apparatus includes a first acquisition unit 110 and a first communication unit 120.

The first acquisition unit 110 is configured to acquire related information of a terminal, where the related information is uplink information or downlink information, and the related information includes traffic data and/or control information.

The first communication unit 120 is configured to send the related information to the second base station through a common transmission channel between base stations.

When the related information is uplink information, the first base station is a current serving base station of the terminal, the second base station is a previous serving base station of the terminal, and the uplink information is supplied to the second base station to be decoded. Alternatively, when the related information is downlink information, the second base station is a current serving base station of the terminal, the first base station is a previous serving base station of the terminal, and the downlink information is supplied to the terminal to be decoded.

The information transmission apparatus described in the present embodiment is an information processing apparatus applied to the base station. The first acquisition unit 110 may correspond to a communication interface used for receiving the related information from a terminal or an upper network element in a network, e.g., an MME or a gateway. The related information herein may be uplink information or downlink information.

The first communication unit 120 may be a communication interface with another base station, and is connected to the first acquisition unit 110. The first communication unit 120 may be an entrance or an exit of the common transmission channel and may be configured to perform information interaction with another base station. In the present embodiment, the first communication unit 120 is configured to send the related information to the second base station. The common transmission channel herein may be various types of transmission channels, and may be a common transmission channel between any two base stations. In the present embodiment, the common transmission channel may be a transmission channel that is pre-established and located between any two base stations in the same paging area or tracking area.

In some embodiments, the first acquisition unit 110 is configured to receive uplink information sent from a terminal in the preset state through a common transmission resource. The terminal in the preset state includes: a terminal disconnected with the second base station at the Uu interface and connected with the second base station at the S1 interface.

The preset state herein may be the above-mentioned inactive state or the light connection state.

In some embodiments, the first acquisition unit 110 is configured to receive the downlink information of the terminal, and the first communication unit 120 is configured to send the downlink information to the second base station through the common transmission channel when the terminal is in the preset state. The terminal in the preset state includes: a terminal disconnected with the first base station at the Uu interface and connected with the first base station at the S1 interface.

In the present embodiment, if the downlink information is received by the first acquisition unit 110, the first communication unit 110 is a communication interface of a previous serving base station of the terminal, and can send the downlink information to a current serving base station of the terminal through the common transmission channel.

In some embodiments, the first communication unit 120 is configured to: send a paging message for paging a terminal in the preset state after receiving the downlink information; receive a response message sent by the second base station through the common transmission channel, where the response message includes a paging response generated by the terminal based on the paging message, or indication information of the second base station indicating that the terminal has been paged; and send the downlink information to the second base station through the common transmission channel after receiving the response message.

If the first base station is the current serving base station of the terminal and receives the downlink information, the terminal needs to be paged first before the downlink information is forwarded to the terminal.

In yet another embodiment, the apparatus further includes: a second acquisition unit, configured to acquire control information; and a package unit, configured to package the control information and uplink data or downlink data into a data packet in a preset format. The first communication unit 120 is further configured to send the data packet to the second base station through the common transmission channel.

In the present embodiment, the second acquisition unit may also correspond to a communication interface, and is capable of receiving control information or obtaining the control information by querying database of its own. The package unit may correspond to a processor or a processing circuit. The processor may include a central processor, a microprocessor, a digital signal processor, an application processor, or a programmable array and the like. The processing circuit may include an application-specific integrated circuit and the like.

The processor or processing circuit may acquire control information and/or packaged data packets by executing preset instructions.

The first communication unit 120 is configured to send the packaged data packet to the second base station through the common transmission channel. Thus, the base station can receive the traffic data and the control information simultaneously upon the receipt of the data packet.

Optionally, the second acquisition unit is configured to acquire a channel identifier and/or auxiliary information of the common transmission channel. The channel identifier is used by the second base station for determining the source base station of the related information. The auxiliary information includes at least one of authentication information, a terminal identifier and a logical channel identifier.

Optionally, the first communication unit 120 is configured to send the auxiliary information to the second base station once through the common transmission channel; or, the first communication unit is configured to send the auxiliary information to the second base station through the common transmission channel in a semi-persistent way.

Optionally, the first communication unit 120 is further configured to receive decoding feedback information for the related information from the common transmission channel.

Figure 9A:
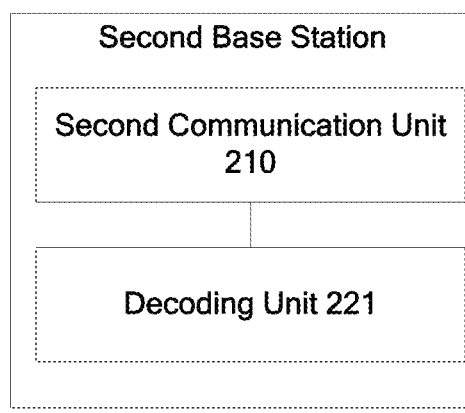
FIG. 9A is a structural diagram illustrating a second base station according to an embodiment of the present disclosure.
Figure 9B:
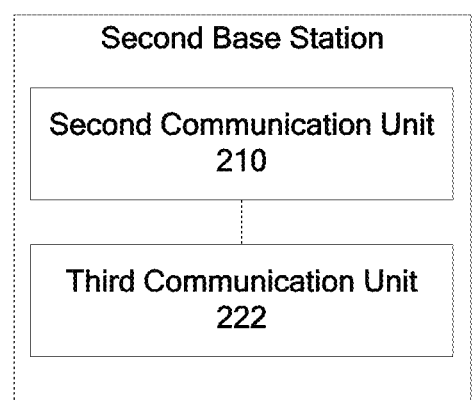
FIG. 9B is a structural diagram illustrating another second base station according to an embodiment of the present disclosure.

As shown in FIG. 9A and FIG. 9B, the present embodiment provides an information transmission apparatus applied to the second base station. The information transmission apparatus includes a second communication unit 210, a decoding unit 221 or a third communication unit 222.

The second communication unit 210 is configured to receive related information of a terminal sent from a first base station through a common transmission channel, where the related information is uplink information or downlink information, and the related information includes traffic data and/or control information.

The decoding unit 221 is configured to decode the uplink information when the first base station is the current serving base station of the terminal and the second base station is the previous serving base station of the terminal.

The third communication unit 222 is configured to send the downlink information to the terminal when the first base station is the previous serving base station of the terminal and the second base station is the current serving base station of the terminal, and the related information is supplied to the terminal to be decoded.

In the second base station provided by the present embodiment, the second base station may be a current serving base station or a previous serving base station of the terminal. The second communication unit herein may also be a communication interface, and may be configured to perform transmission of uplink information or downlink information of the terminal with the first base station through a common transmission channel.

The decoding unit 221 may be a processor or processing circuit in the second base station. The processor or processing circuit may be as described in the previous embodiments.

The third communication unit 222 is a communication interface for communication between the second base station and the terminal, such as a Uu interface.

In some embodiments, the third communication unit 222 is further configured to: when the second base station is a current serving base station of the terminal, forward a paging message of the first base station for paging the terminal in the preset state, where the terminal in the preset state includes a terminal disconnected with the first base station at the Uu interface and kept in connection with the first base station at the S1 interface; and receive a paging response message returned by the terminal based on the paging message.

The second communication unit 210 is configured to: receive the response message returned based on the paging message through the common transmission channel, where the response message includes a paging response or indication information generated based on the paging response and indicating that the terminal has been paged; and receive the downlink information sent through the common transmission channel after the terminal is paged by the second base station.

In some embodiments, the second communication unit 210 is configured to receive the uplink information of the terminal forwarded by the first base station through the common transmission channel.

In yet another embodiment, the second communication unit 210 is further configured to receive a channel identifier and/or auxiliary information of the common transmission channel. The channel identifier is used by the second base station for determining a source base station of the related information. The auxiliary information includes at least one of authentication information, a terminal identifier and a logical channel identifier.

Optionally, the second communication unit 210 is further configured to send decoding feedback information for the related information to the first base station through the common transmission channel.

An embodiment of the present disclosure provides a computer storage medium. The computer storage medium is configured to store computer-executable instructions. After being executed, the computer-executable instructions are capable of implementing the information transmission method provided by one or more of technical solutions described above, for example, the one or more of the methods shown in FIG. 2, FIG. 3, and FIG. 4.

The computer storage medium may include: a portable storage device, Read-Only Memory (ROM), Random Access Memory (RAM), magnetic disk, optical disk or another medium that can store program codes. Optionally, the computer storage medium may be a non-transient storage medium.

It should be understood that the apparatuses and methods disclosed in the embodiments of the present application may be implemented in other ways. The apparatus embodiments described above are merely illustrative. For example, the division of units is merely a logical function division, and, in practice, the division of units may be implemented in other ways. For example, multiple units or components may be combined or may be integrated into another system, or some features may be omitted or not executed. In addition, coupling, direct coupling or communication connections between the presented or discussed components may be indirect coupling or communication connections, via interfaces, between devices or units, and may be electrical, mechanical or in other forms.

The units described above as separate components may or may not be physically separated. Components presented as units may or may not be physical units, that is, may be located in one place or may be distributed over multiple network units. Part or all of these units may be selected according to practical requirements to achieve objects of the solutions in the embodiments of the present disclosure.

Moreover, various function units in embodiments of the present disclosure may all be integrated in one processing module, or each unit may be used as a separate unit, or two or more units may be integrated into one unit. The integrated function unit may be implemented by hardware or may be implemented by hardware plus a software function unit.

It should be understood by those skilled in the art that all or part of the steps in the method embodiments described above may be implemented by hardware instructed by relevant programs, these programs may be stored in a computer-readable storage medium and, when executed, these programs execute steps included in the method embodiments described above; and the preceding storage medium includes: a mobile storage device, a ROM, a RAM, a magnetic disk, an optical disk or another medium capable of storing program codes.

The above are only specific embodiments of the present disclosure and are not intended to limit the present disclosure. It is easy for those skilled in the art to conceive modifications or substitutions within the technical scope of the present disclosure. These modifications or substitutions are within the scope of the present disclosure. Therefore, the protection scope of the present disclosure is limited by the appended claims.

INDUSTRIAL APPLICABILITY

In an embodiment of the present disclosure, the base stations can exchange related information of the terminal through the common transmission channel, so that a target base station to which a terminal in a specific state is to be connected can acquire the related information of the terminal to decode data later, thereby avoiding decoding errors caused by the fact that the target base station cannot acquire the related information, and having positive industrial effect. Moreover, the success rate of decoding can be improved by exchanging information through the common transmission channel between the base stations, which is easy to be implemented and has strong industrial realizability.

What is claimed is:

1. An information transmission method, applied to a first base station and comprising:
    acquiring uplink information of a terminal from the terminal, wherein the uplink information comprises at least one of traffic data and control information; and
    sending the uplink information to a second base station through a common transmission channel between base stations,
    wherein the first base station is a current serving base station of the terminal, the second base station is a previous serving base station of the terminal, and the uplink information is supplied to the second base station to be decoded; and
    receiving decoding feedback information of the uplink information through the common transmission channel from the second base station, wherein the decoding feedback information is used to indicate whether the uplink information is decoded successfully by the second base station;
    wherein acquiring the uplink information of the terminal from the terminal comprises:
    receiving the uplink information sent by a terminal in a preset state through a common transmission resource, wherein the preset state comprises that the terminal is disconnected with the second base station at a Uu interface while the second base station stays connected with an upper layer device at a S1 interface, and the common transmission resource comprises a public unauthorized transmission resource which comprises spectrum resources and time domain resources.

2. The method of claim 1, further comprising:
    encapsulating the control information with uplink data into a data packet in a preset format;
    wherein the sending the uplink information to a second base station through a common transmission channel between base stations comprises: sending the data packet to the second base station through the common transmission channel.

3. The method of claim 2, wherein acquiring control information comprises acquiring at least one of a channel identifier and auxiliary information of the common transmission channel, wherein the channel identifier is used by the second base station for determining a source base station of the uplink information; and the auxiliary information comprises at least one of authentication information, a terminal identifier and a logical channel identifier.

4. The method of claim 3, wherein sending the data packet to the second base station through the common transmission channel comprises one of:
    sending the auxiliary information to the second base station once through the common transmission channel; and
    sending the auxiliary information to the second base station through the common transmission channel in a semi-persistent way.

5. The method of claim 1, wherein the common transmission channel is established between two base stations in the same paging area or between two base stations in the same tracking area.

6. A non-transitory computer-readable storage medium, wherein the computer storage medium is stored with computer-executable instructions that when executed are used to implement the information transmission method of claim 1.

7. An information transmission method, applied to a second base station and comprising:
    receiving uplink information of a terminal from a first base station through a common transmission channel, wherein the uplink information comprises at least one of traffic data and control information
    the first base station is a current serving base station of the terminal and the second base station is a previous serving base station of the terminal and
    decoding the uplink information and
    feedback decoding feedback information of the uplink information to the first base station through the common transmission channel, wherein the decoding feedback information is used to indicate whether the uplink information is decoded successfully by the second base station;
    wherein the uplink information of the terminal is sent to the first base station from a terminal in a preset state through a common transmission resource, the preset state comprises that the terminal is disconnected with the second base station at a Uu interface while the second base station stays connected with an upper layer device at a S1 interface, and the common transmission resource comprises a public unauthorized transmission resource which comprises spectrum resources and time domain resources.

8. The method of claim 7, wherein receiving uplink information of a terminal sent from a first base station through the common transmission channel comprises:
    receiving the uplink information of the terminal forwarded by the first base station through the common transmission channel.

9. The method of claim 7, further comprising: receiving at least one of a channel identifier and auxiliary information of the common transmission channel, wherein the channel identifier is used by the second base station for determining a source base station of the uplink information; and the auxiliary information comprises at least one of authentication information, a terminal identifier and a logical channel identifier.

10. An information transmission apparatus, applied to a second base station and comprising a processor and a storage device for storing computer executable instructions that when executed by the processor cause the processor to perform the followings to implement the information transmission method of claim 7.

11. An information transmission apparatus, applied to a first base station and comprising a processor and a storage device for storing computer executable instructions that when executed by the processor cause the processor to:
    acquire uplink information of a terminal from the terminal, wherein the uplink information comprises at least one of traffic data and control information; and
    send the uplink information to a second base station through a common transmission channel between base stations, wherein the first base station is a current serving base station of the terminal, the second base station is a previous serving base station of the terminal, and the uplink information is supplied to the second base station to be decoded;

receive decoding feedback information of the uplink information through the common transmission channel from the second base station, wherein the decoding feedback information is used to indicate whether the uplink information is decoded successfully by the second base station; and the processor acquires the uplink information of the terminal from the terminal by:

receiving the uplink information sent by a terminal in a preset state through a common transmission resource, wherein the preset state comprises that the terminal is disconnected with the second base station at a Uu interface while the second base station stays connected with an upper layer device at a S1 interface, and the common transmission resource comprises a public unauthorized transmission resource which comprises spectrum resources and time domain resources.

12. The apparatus of claim 11, wherein the processor is further configured to:

acquire control information;

encapsulate the control information with uplink data into a data packet in a preset format; and send the data packet to the second base station through the common transmission channel.

13. The method of claim 12, wherein the processor acquires the control information by:

acquiring at least one of a channel identifier and auxiliary information of the common transmission channel, wherein the channel identifier is used by the second base station for determining a source base station of the uplink information; and the auxiliary information comprises at least one of authentication information, a terminal identifier and a logical channel identifier.

14. The method of claim 13, wherein the processor sends the data packet to the second base station through the common transmission channel by one of:

sending the auxiliary information to the second base station once through the common transmission channel; and sending the auxiliary information to the second base station through the common transmission channel in a semi-persistent way.

15. The method of claim 11, wherein the common transmission channel is established between two base stations in the same paging area or between two base stations in the same tracking area.

* * * * *